(12) United States Patent
Kessler et al.

(10) Patent No.: US 6,681,306 B1
(45) Date of Patent: Jan. 20, 2004

(54) METHOD AND APPARATUS FOR INCREASING SCAVENGING GARBAGE COLLECTION EFFECTIVENESS

(75) Inventors: Peter B. Kessler, Palo Alto, CA (US); Steffen Grarup, Palo Alto, CA (US); David M. Ungar, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/450,847

(22) Filed: Nov. 29, 1999

(51) Int. Cl.[7] ............................................. G06F 12/12
(52) U.S. Cl. ....................... 711/171; 711/159; 711/173; 707/206
(58) Field of Search ............................. 711/171, 5, 129, 711/133, 134, 135, 136, 159, 160, 165, 173, 170, 153; 707/205, 206; 710/57; 709/104, 105

(56) References Cited

U.S. PATENT DOCUMENTS

| 5,495,457 | A | * | 2/1996 | Takagi ........................... 369/30 |
| 5,787,466 | A | * | 7/1998 | Berliner ........................ 711/117 |
| 6,209,066 | B1 | * | 3/2001 | Holzle et al. ................. 711/153 |
| 6,308,185 | B1 | * | 10/2001 | Grarup et al. ............... 707/206 |

OTHER PUBLICATIONS

Wilson et al., Design of the Opportunistic Garbage Collector, Oct. 1989, OOPSLA '89 Proceedings.
Jones et al., Garbage Collection: Algorithms for Automatic Dynamic Memory Management, 1996, GB XP002177539 cited in the applications pp. 152–164.
Jones et al., "Garbage Collection: Algorithms For Automatic Dynamic Memory Management," 1996, pp. 127–128.
Richard Jones, Garbage collection: algorithms for automatic dynamic memory management, 1954, Library of Congress Cataloging–in–Publication Data, pp. 127–128.
Stefanovic et al., Age–Based Garbage Collection, Nov. 1999, OOPSLA 99.

* cited by examiner

*Primary Examiner*—Matthew Kim
*Assistant Examiner*—Matthew D. Anderson
(74) *Attorney, Agent, or Firm*—Beyer Weaver & Thomas, LLP

(57) ABSTRACT

Methods and apparatus for enabling an efficient generational scavenging garbage collection to be performed on a managed memory area are disclosed. According to one aspect of the present invention, a method for reclaiming memory space uses a managed memory area that includes a first area and a second area. The first area is arranged to store recently allocated objects, while the second area being arranged to store older objects. The method includes determining when a first section of the first area in which new objects are to be allocated is substantially filled. When it is determined that the first section is substantially filled, a garbage collection is performed on a second section of the first. After the garbage collection, the second section is set to support new object allocation such that new objects are allocated in the second section, while the first section is reset such that it is no longer arranged to support new object allocation. In one embodiment, performing the garbage collection on the second section includes copying a live object from the second section into the second area.

22 Claims, 7 Drawing Sheets

METHOD AND APPARATUS FOR INCREASING SCAVENGING GARBAGE COLLECTION EFFECTIVENESS

BACKGROUND OF THE INVENTION

1. Field of Invention

The present invention relates generally to methods and apparatus for improving the performance of software applications. More particularly, the present invention relates to methods and apparatus for reducing the overhead associated with performing memory allocation.

2. Description of the Related Art

The amount of available memory is typically limited in computing systems such as object-based computing systems. Hence, memory must generally be conserved and recycled. Many computer programming languages enable software developers to dynamically allocate memory within a computer system. Some programming languages require explicit manual deallocation of previously allocated memory, which may be complicated and prone to error. Languages which require explicit manual memory management include the C and C++ programming languages. Other programming languages utilize automatic storage-reclamation to reclaim memory that is no longer necessary to ensure the proper operation of computer programs which allocate memory from the reclamation system. Such automatic storage-reclamation systems reclaim memory without explicit instructions or calls from computer programs which were previously utilizing the memory.

In object-oriented or object-based systems, the typical unit of memory allocation is commonly referred to as an object or a memory object, as will be appreciated by those skilled in the art. Objects which are in use are generally referred to as "live" objects, whereas objects which are no longer needed to correctly execute computer programs are typically referred to as "garbage" objects or "dead" objects. The act of reclaiming garbage objects is commonly referred to as garbage collection, while an automatic storage-reclamation system is often referred to as a garbage collector. Computer programs which use automatic storage-reclamation systems are known as mutators due to the fact that such computer programs are capable of changing live memory objects during execution. Computer programs written in languages such as the Java™ programming language (developed by Sun Microsystems, Inc. of Palo Alto, Calif.) and the Smalltalk programming language use garbage collection to automatically manage memory.

Generally, to reduce the computational burden associated with garbage collection, a managed memory area is divided into smaller sections to enable garbage collection to be performed locally in one area at a time. One memory partitioning scheme is generational garbage collection. In generational garbage collection, objects are separated based upon their lifetimes as measured from the time the objects were created. Generational garbage collection is described in more detail in *Garbage Collection: Algorithms for Automatic Dynamic Memory Management* by Richard Jones and Rafael Lins (John Wiley & Sons Ltd., 1996), which is incorporated herein by reference in its entirety. "Younger" objects have been observed as being more likely to become garbage than "older" objects. As such, generational garbage collection may be used to increase the overall efficiency of memory reclamation.

FIG. 1 is a diagrammatic representation of an area of computer memory which contains objects and is suitable for generational garbage collection. A managed area of memory 102, which is typically a heap associated with a computer system, is divided into a new generation 104 and an old generation 106. New generation 104 contains recently created objects 110, e.g., objects 110a–110e, while old generation 106 contains objects 110 which were created less recently, e.g., objects 110f and 110g. When an object 110 is to be created in memory 102, the object is created in new generation 104. In the event that new generation 104 becomes full to the extent that a new object 110 may not be allocated in new generation 104, a scavenging garbage collection may be performed on new generation 104 to free memory space.

In general, an object 110 may be referenced by other objects 110. By way of example, object 110b has a pointer 114a to object 110a. As will be understood by one of skill in the art, object 110b may be considered to be live when a root points to object 110b transitively. That is, when object 110b is pointed to by a list of pointers which, in turn, is identified by a root, then object 110b is considered to be live.

When new generation object 110d is live and points to old generation object 110f, garbage collection performed in old generation 106 does not generally "collect" object 110f, since object 110f is referenced by a live object. However, if new generation object 110d is dead, a garbage collection performed in new generation 104 may result in old generation object 110f becoming unreachable if old generation object 110f is not be pointed to by any other object. If old generation object 110f is unreachable, then garbage collection performed in old generation 106 will result in the collection of old generation object 110f. When a pointer 114b points from new generation object 110d to old generation object 110f, old generation object 110f is considered to be tenured garbage, as old generation object 110f is not collectable using new generation garbage collection, i.e., a garbage collection performed on new generation 104.

During a scavenging garbage collection process performed on new generation 104 when new generation 104 becomes full, as will be discussed below with respect to FIG. 2, live objects 110 in new generation 104 are copied from new generation 104 into old generation 106. Newly allocated objects 110 in new generation 104 are often live and, hence, must be copied from new generation 104 into old generation 106 during a scavenging garbage collection. In general, copying operations are slow and expensive. As a result, the overall garbage collection process is expensive.

Some generational garbage collectors copy live objects from a new generation into an intermediate area before the objects are tenured to an old generation. FIG. 1b is a diagrammatic representation of a memory space which is divided into a new generation, an intermediate area, and an old generation. A memory space 202 includes a new generation 204, a "from-space" and "to-space" 205, and an old generation 206. Newly allocated objects 210 are allocated in new generation 204. When new generation 204 becomes full, live objects 210 are copied out of new generation 204 and into from-space and to-space 205. Objects 210 are allowed to remain in from-space and to-space 205 for some period of time, e.g., for a predetermined amount of time or until from-space and to-space 205 is full, to enable objects 210 in from-space and to-space 205 to die. Periodically, as for example when from-space and to-space 205 is full, a garbage collection is performed on from-space and to-space 205. During garbage collection on from-space and to-space 205, live objects in from-space and to-space 205 are copied into, or tenured to, old generation 206.

With reference to FIG. 2, one conventional method of performing a scavenging garbage collection on a managed area of memory which is divided into a new generation and an old generation, e.g., managed area 102 of FIG. 1, will be described. Specifically, a process of performing a scavenging garbage collection on a new generation will be discussed. A process 252 of performing a garbage collection begins at step 256 in which a list of live objects in the new generation is obtained. A list of live objects may be obtained using a variety of different methods. For example, one method which may be used to obtain a list of live objects involves studying global objects, or roots, which reference objects within either or both a new generation and an old generation to identify objects which are currently in use.

After a list of live objects is obtained, a live object identified in the list is obtained from the new generation in step 258. During a scavenging garbage collection, live objects in the new generation are generally copied into the old generation in an effort to free memory space in the new generation. Hence, in step 260, the live object is copied to the old generation. As should be understood by those skilled in the art, copying a live object into the old generation includes copying objects referenced by the live object, in addition to changing any pointers which identify the live object such that the pointers instead identify the copy of the object. Further, copying the live object from the new generation into the old generation effectively frees memory space in the new generation, which was associated with the live object, for other uses.

Once the live object is copied into the old generation in step 260, a determination is made in step 262 as to whether there are additional live objects remaining in the new generation. That is, it is determined if there are more live objects identified in the list of live objects. When it is determined that there are additional live objects in the list of live objects, then process flow returns to step 258 where the next live object identified in the list is obtained. Alternatively, when there are no additional live objects in the new generation, the indication is that there are no live objects remaining in the new generation, and the process of performing a scavenging garbage collection on the new generation is completed.

A scavenging garbage collection is often an expensive process. Specifically, as mentioned above, the copying of a live object during a scavenging garbage collection is a slow and expensive operation. Hence, when many live objects are copied during a scavenging garbage collection, or when a few large objects are copied during a scavenging garbage collection, the garbage collection process itself becomes both slow and costly.

Therefore, what is desired is a method for reducing the cost associated with a generational scavenging garbage collection. That is, what is needed is a method and apparatus for reducing the number of live objects copied to an old generation during a generational scavenging garbage collection.

SUMMARY OF THE INVENTION

The present invention relates to a memory space which enables an efficient generational scavenging garbage collection to be performed. According to one aspect of the present invention, a method for reclaiming memory space uses a managed memory area that includes a first area and a second area. The first area is arranged to store recently allocated objects when the first area has available memory space, while the second area being arranged to store older objects. The method includes determining when a first section of the first area in which new objects are to be allocated is substantially filled. When it is determined that the first section is substantially filled, a garbage collection is performed on a second section of the first. After the garbage collection, the second section is set to support new object allocation such that new objects are allocated in the second section, while the first section is reset such that it is no longer arranged to support new object allocation. In one embodiment, performing the garbage collection on the second section includes copying a live object from the second section into the second area.

In another embodiment, the method also includes attempting to allocate a new object in the second section after the second section is set to support new object allocation, and determining when the second section is substantially filled. When it is determined that the second section is not substantially filled, a new object is allocated in the second section. Alternatively, when it is determined that the second section is substantially filled, a garbage collection is performed on the first section. In such an embodiment, when determined that the second section is substantially filled, the method may further include resetting the second section such that the second section is no longer arranged to support new object allocation, resetting the first section such that the first section is once again arranged to support new object allocation, and allocating the new object in the first section.

According to another aspect of the present invention, a computer system for reclaiming memory space in a managed memory area that includes a first area and a second area includes a processor and a determinator for determining when a first section of the first area, which supports new object allocation, is substantially filled. The system also includes a garbage collector that scavenges a second section of the first area when it is determined that the first section is substantially filled, in addition to a tracking mechanism arranged to set the second section such that the second section is arranged to support new object allocation and to set the first section such that the first section is no longer arranged to support new object allocation. In one embodiment, the first section and the second section are separated by a boundary, and the system additionally includes an adjuster for altering the relative sizes of the first section and the second section by moving the boundary.

According to still another aspect of the present invention, a memory structure that stores objects in a computer system includes a first area and a second area. The first area is effectively partitioned into a first section, which may store a recently allocated object, and a second section, which may store a first object allocated before the recently allocated object. When the first section is full, the second section is arranged to undergo a garbage collection. The second area of the memory structure stores a second object that was allocated prior to the allocation of the first object. In one embodiment, the second area is further arranged to store a copy of the first object when a garbage collection is performed on the second section. In such an embodiment, when the second section undergoes the garbage collection, the second section is then used to store a third object which is allocated at some point after the allocation of the recently allocated object.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 2 is a process flow diagram which illustrates a process of performing a garbage collection a conventional memory space, i.e., memory space 102 of FIG. 1a.

DETAILED DESCRIPTION OF THE EMBODIMENTS

Figure 1A:
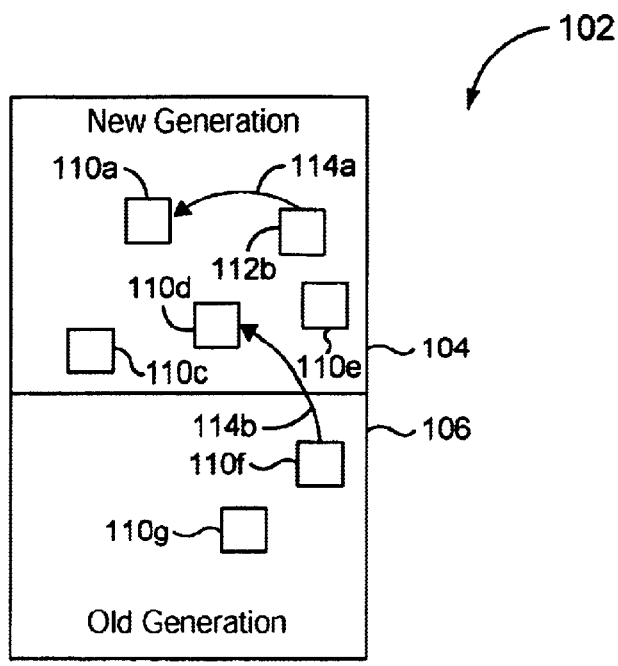
FIG. 1a is a diagrammatic representation of one conventional memory space.
Figure 1B:
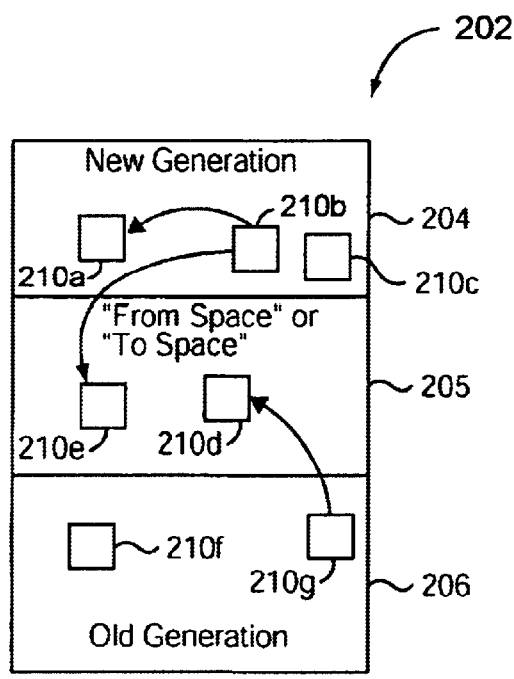
FIG. 1b is a diagrammatic representation a second conventional memory space.
Figure 2:
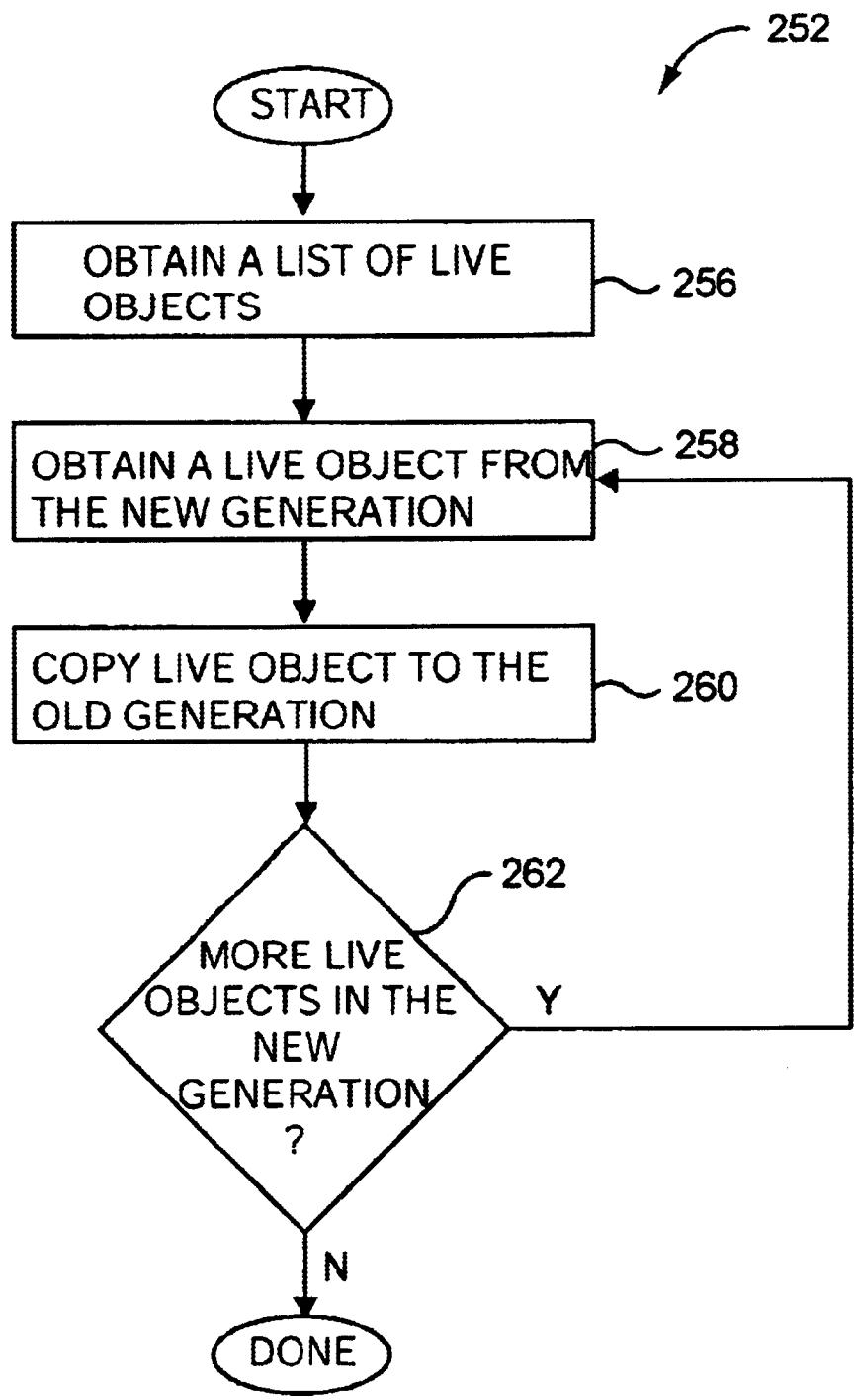

A generational scavenging garbage collection typically involves scavenging a new generation of a managed memory area, which also includes an old generation, when the new generation is filled to the extent that a new object may not be allocated in the new generation. During scavenging, as described in *Garbage Collection: Algorithms for Automatic Dynamic Memory Management* by Richard Jones and Rafael Lins (John Wiley & Sons Ltd., 1996), which is incorporated herein by reference in its entirety, live objects are copied from the new generation into the old generation. As copying live objects is expensive and slow, a scavenging garbage collection is typically inefficient. Since copying live objects during a scavenging garbage collection causes the garbage collection to be slow and expensive, reducing the number of live objects copied during a garbage collection from a new generation to an old generation may increase the effectiveness and efficiency of garbage collection.

It has been observed that objects at a younger end, or newer end, of a new generation have more of a tendency to be live than objects at a older end of a new generation. That is, the most recently allocated objects in a new generation have been observed to be more likely to be live than the less recently allocated objects in the new generation. Hence, as the tenure of an object in the new generation lengthens, i.e., as an object becomes an older object in the new generation, the likelihood that the object will die increases.

In one embodiment of the present invention, a new generation of a managed area of memory space, which is divided into a new generation and an old generation, is partitioned. Specifically, the new generation is partitioned into two sections. The most recently allocated objects in the new generation are kept in a "younger" section, while the less recently allocated objects in the new generation are kept in an "older" section. When the new generation becomes filled to the extent that it is not possible to allocate an additional object in the new generation, only the older section of the new generation is scavenged. As the objects in the older section are older than the objects in the younger section, the objects in the older section are typically dead. Therefore, the amount of copying associated with a scavenging garbage collection is relatively low. Further, by not scavenging the younger section, the objects in the younger section are allowed more time to die. After scavenging of the older section is completed, the older section effectively becomes the current younger section, while the younger section effectively becomes the current older section on which scavenging will be performed when the current younger section fills up.

By scavenging only one section of the new generation, only one section of the new generation will be available for object allocation. Therefore, the number of overall scavenging garbage collections will be increased over the number associated with a conventional, undivided new generation. However, as fewer objects will generally need to be copied into the old generation during a garbage collection performed on the partitioned new generation, the amount of time and computational resources used by a garbage collection will generally be low. That is, although more garbage collections will typically occur, the garbage collections will generally be relatively quick and inexpensive.

Figure 3:
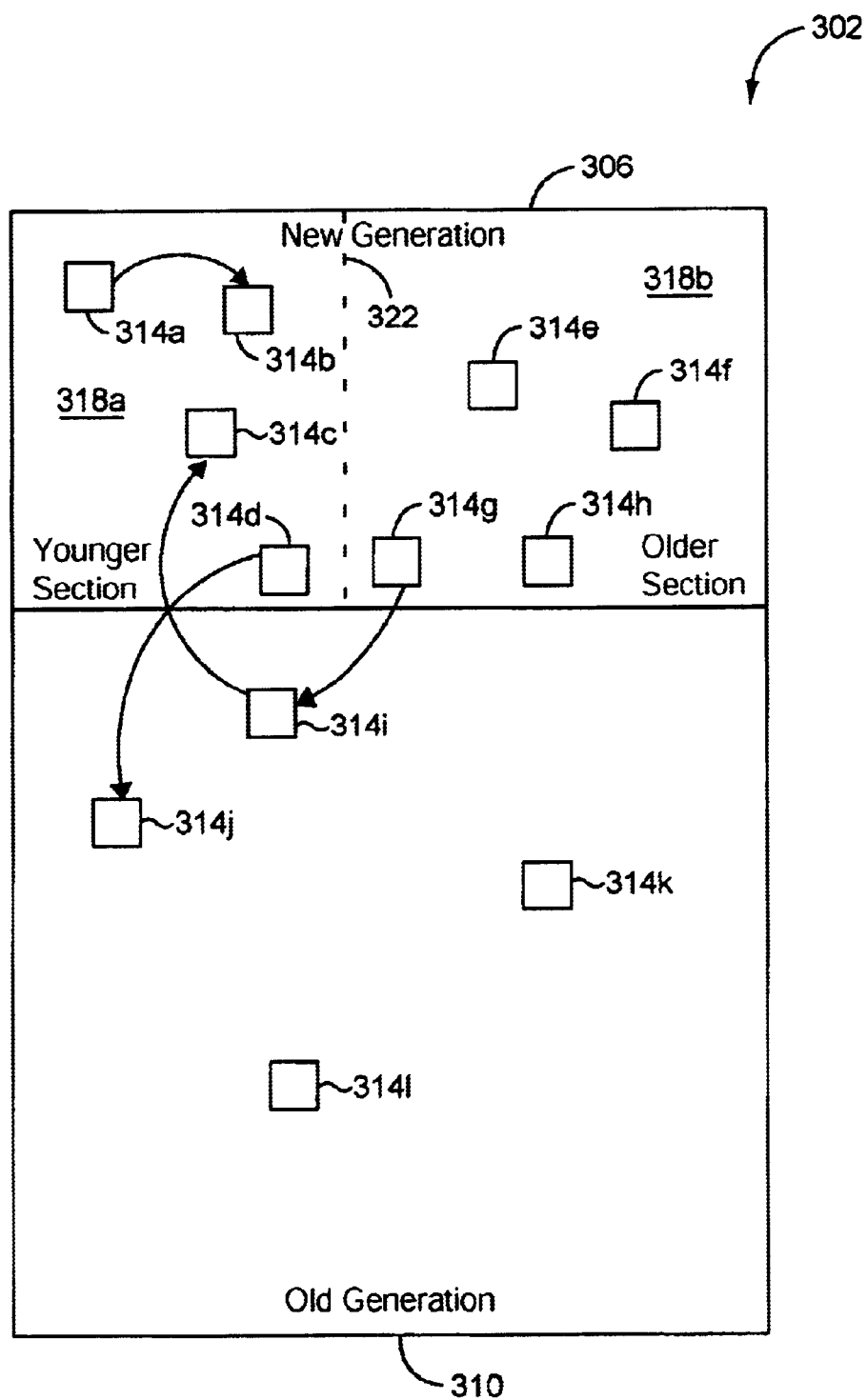
FIG. 3 is diagrammatic representation of a memory space with a partitioned new generation in accordance with an embodiment of the present invention.

Referring to FIG. 3, a managed area of memory space with a partitioned new generation will be described in accordance with an embodiment of the present invention. A memory space 302, which is often a heap associated with a computer system, is divided into a new generation 306 and an old generation 310. New generation 306 is arranged to contain the most recently allocated objects 314 in memory, while old generation 306 is arranged to contain objects 314 which were not recently allocated.

In the described embodiment, new generation 306, which may also be referred to as a "nursery" or an "eden," is partitioned into two sections 318. Section 318a is a younger section of new generation 306, while section 318b is an older section of new generation 306. Section 318a contains the younger objects 314 in new generation 306, while section 318b contains the older objects 314 in new generation 306. Therefore, when objects 314 are allocated in new generation 306, objects 314 are allocated in section 318a.

For ease of explanation, section 318a and section 318b may effectively be considered to be two separate nurseries. In other words, each section 318 may be treated as a separate new generation. When sections 318 are considered as separate nurseries, once the section in which objects are to be allocated, e.g., section 318a, is full, the other section, e.g., section 318b, is scavenged and becomes the new nursery in which objects are allocated. Similarly, when section 318b is the nursery in which objects are to be allocated, once section 318b is full, a garbage collection is performed is performed in section 318a which then becomes the nursery in which objects are to be allocated.

An attempt to allocate an object in section 318a may be unsuccessful when there is not sufficient memory space in section 318a to allocate to a new object. As such, a garbage collection may be performed to reclaim memory space such that a new object may be allocated. It should be appreciated that typically, when section 318a does not include sufficient memory space to support the allocation of a new object, section 318b is also effectively full. In one embodiment, when section 318a is full, a generational scavenging garbage collection is performed on section 318b. Since objects 314 in section 318b are likely to be garbage objects, e.g., object 314e, the number of objects 314 which are copied into old generation 310 during garbage collection is typically relatively low. As shown, object 314g is a live object in section 318b, and would be copied into old generation 310 during a garbage collection. Since few live objects 314 will generally be copied from section 318b into old generation 310, the overhead associated with the garbage collection may be relatively low. As such, the garbage collection will generally occur efficiently. Once garbage collection is performed on section 318b, reclaimed memory space will generally be available for the allocation of objects 314 as will be described below with reference to FIGS. 4 and 5.

A boundary 322 which divides new generation 306 into sections 318 is a flexible, or moveable, boundary. In other words, boundary 322 may effectively be moved to alter the relative sizes of sections 318. For instance, in one embodiment, boundary 322 may be positioned such that section 318a and section 318b each contain substantially the same amount of memory space.

It should be appreciated that the positioning of boundary 322 may be a dynamic process. Specifically, boundary 322 may be repositioned as necessary during processing to effectively optimize the performance of a computing system. By way of example, if it is observed that during garbage collection, a significant number of live objects 314 are copied from section 318b into old generation 310, then boundary 322 may be positioned to increase the size of section 318a relative to section 318b such that live objects 314 are more likely to remain in section 318b until they die. Alternatively, when very few live objects 314 are copied into old generation 310 during garbage collection, boundary 322 may be repositioned such that the relative size of section 318b, is increased to decrease the frequency of scavenges. Although the methods which are used to determine whether or not to reposition boundary 322 may vary widely, one suitable method may be based upon the amount of overhead associated with garbage collection, e.g., the position of boundary 322 may be adjusted such that the amount of associated computational overhead is within a desired range.

As will be understood by those skilled in the art, objects in memory space 302 are typically referenced by a fixed root (not shown) which is external to memory space 302 and includes pointers to some objects 314 located in memory space 302. Any objects 314 which may be reachable by following references from the fixed root are considered to be live objects. In order to operate on an individual memory area such as section 318b, a garbage collector needs knowledge of all references into section 318b. References into a specific area are referred to as roots for that area. It should be appreciated that roots may include both external references, e.g., fixed roots, and references from other areas of computer memory. Accordingly, garbage collectors generally provide mechanisms for finding and tracking roots, or references.

Some objects 314 within new generation 306 may also be considered as roots when they are assumed to be live and include a pointer to another object 314. By way of example, object 314g may be considered to be a root. When object 314g is live and points to object 314i in old generation 310, garbage collection performed in old generation 310 does not "collect" object 314i. However, if object 314g is dead, a garbage collection performed section 318b will result in object 314i becoming unreachable, since object 314i will not be pointed to by any other object 314. If object 314i is unreachable, then garbage collection performed in old generation 310 will result in the collection object 314i.

Figure 4:
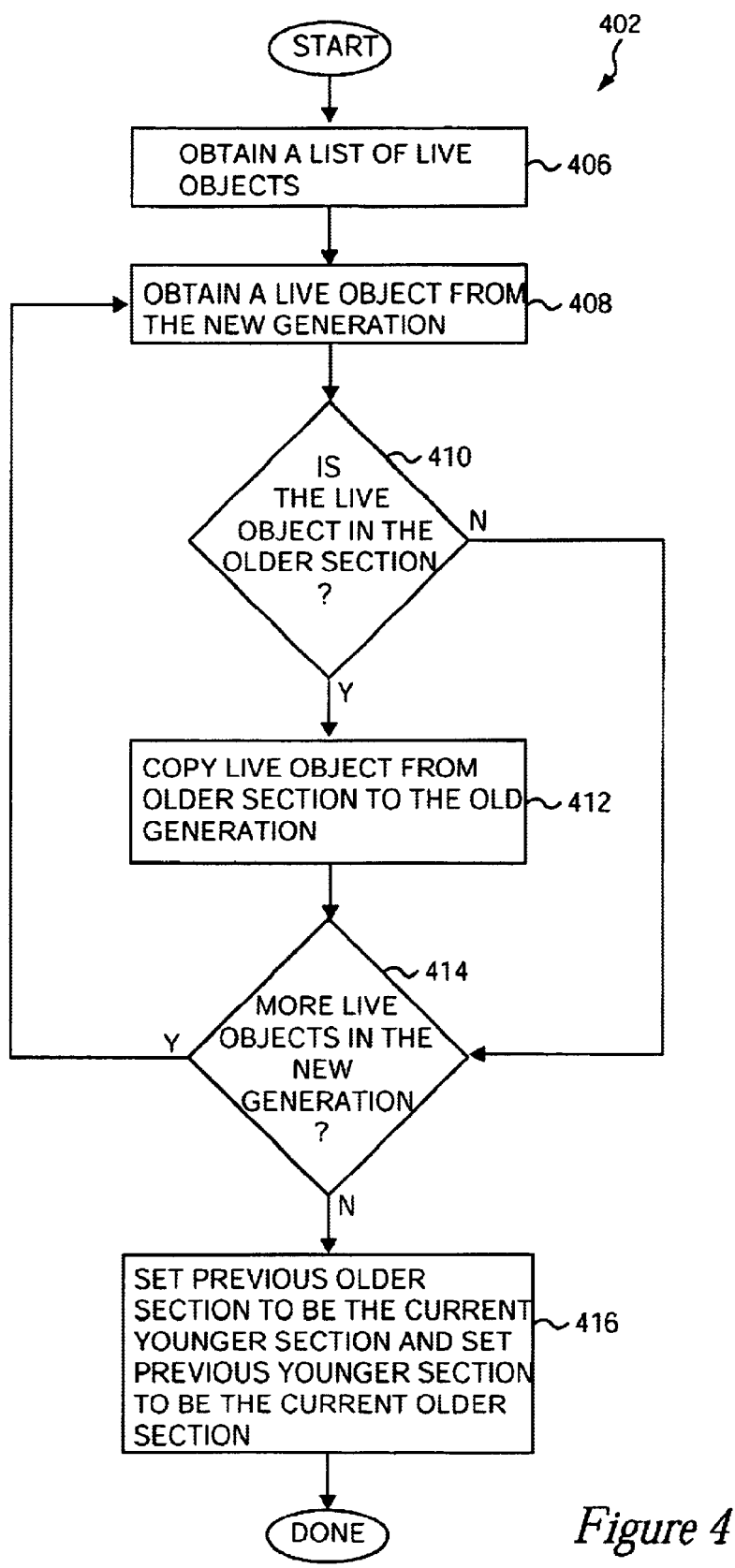
FIG. 4 is a process flow diagram which illustrates a process of performing a garbage collection on a memory space with a partitioned new generation, i.e., memory space 302 of FIG. 3, in accordance with an embodiment of the present invention.

FIG. 4 is a process flow diagram which illustrates a process of performing a scavenging garbage collection on a memory space with a partitioned new generation, i.e., memory space 302 of FIG. 3, in accordance with an embodiment of the present invention. A process 402 of performing a garbage collection on a portion of a new generation begins at step 406 in which a list of live objects in a memory space is obtained. One method which is used to obtain a list of live objects involves tracing roots, or global objects which reference objects within either or both a new generation and an old generation, to determine which objects are still in use. Roots may, for example, be located on a stack or within a new generation.

In step 408, a live object is obtained from the new generation. Obtaining a live object, in one embodiment, includes obtaining the first live object identified in the list of live objects. Once the live object is obtained from the new generation, a determination is made in step 410 as to whether the live object is in the older section of the new generation. If the determination is that the live object is in the older section, then in step 412, the live object is copied from the older section into the old generation. In general, copying an object from the older section into the old section includes copying bits associated with the object, as well as resetting any pointers to the object such that the pointers identify the copied object. Additionally, copying an object includes changing any pointer originating from the object to originate from the copied object.

After the live object is copied from the older section into the old generation in step 412, it is determined in step 414 whether there are additional live objects in the new generation. In other words, a determination is made regarding whether there are additional live objects, which are identified in the list of live objects, that are to be obtained. When it is determined that there are additional live objects to obtain, then process flow returns to step 408 where another live object is obtained from the new generation.

Alternatively, when it is determined in step 414 that there are no more live objects remaining in the new generation, e.g., that all live objects in the older section of the new generation have been copied into the old generation, then the older section is effectively set to be the current younger section, and the younger section is effectively set to be the current older section by updating bookkeeping information for the allocator such that allocations will occur in the current younger section. That is, the older section becomes the newly defined younger section, and the younger section becomes the newly defined older section. As will be appreciated by those skilled in the art, after a scavenge on a section is completed, that section will no longer contain live objects. During a scavenge performed on a section, the live objects are copied out of the section.

In effectively swapping the older section and the younger section, any pointers and variables associated with tracking the new generation are reset such that any new objects which are allocated in the new generation, as will be discussed below with reference to FIG. 5, will be allocated in the empty current younger section. In one embodiment, non-live objects remaining in the current younger section, or the newly defined younger section, may be abandoned or otherwise set to zero such that the memory space in the current younger section is freed. Once the current younger section, which is effectively empty, and the current older section, which is full, of the new generation are essentially set, the garbage collection process is completed.

Returning to step 410 and the determination of whether a live object obtained from the new generation is in the older section, when it is determined that the live object is not in the older section, then the implication is that the live object is in the younger section. As such, the live object is not copied into the old generation and is, instead, allowed to remain in the younger section. Accordingly, process flow proceeds to step 414 where a determination is made regarding whether there are additional live objects to obtain from the new generation.

Although a garbage collection may occur at substantially any suitable time during the processing of an application, a garbage collection typically occurs either when an attempt is made to allocate an object or during pause in processing. A garbage collection may occur during a pause in processing since during a pause, computational resources are generally available. By way of example, garbage collection may occur during a safepoint. A safepoint, as will be appreciated by those skilled in the art, occurs when substantially every thread in a system is in a safe region or is otherwise halted from operating such that the threads effectively cause no problems for the performance of a global operation such as a garbage collection.

Figure 5:
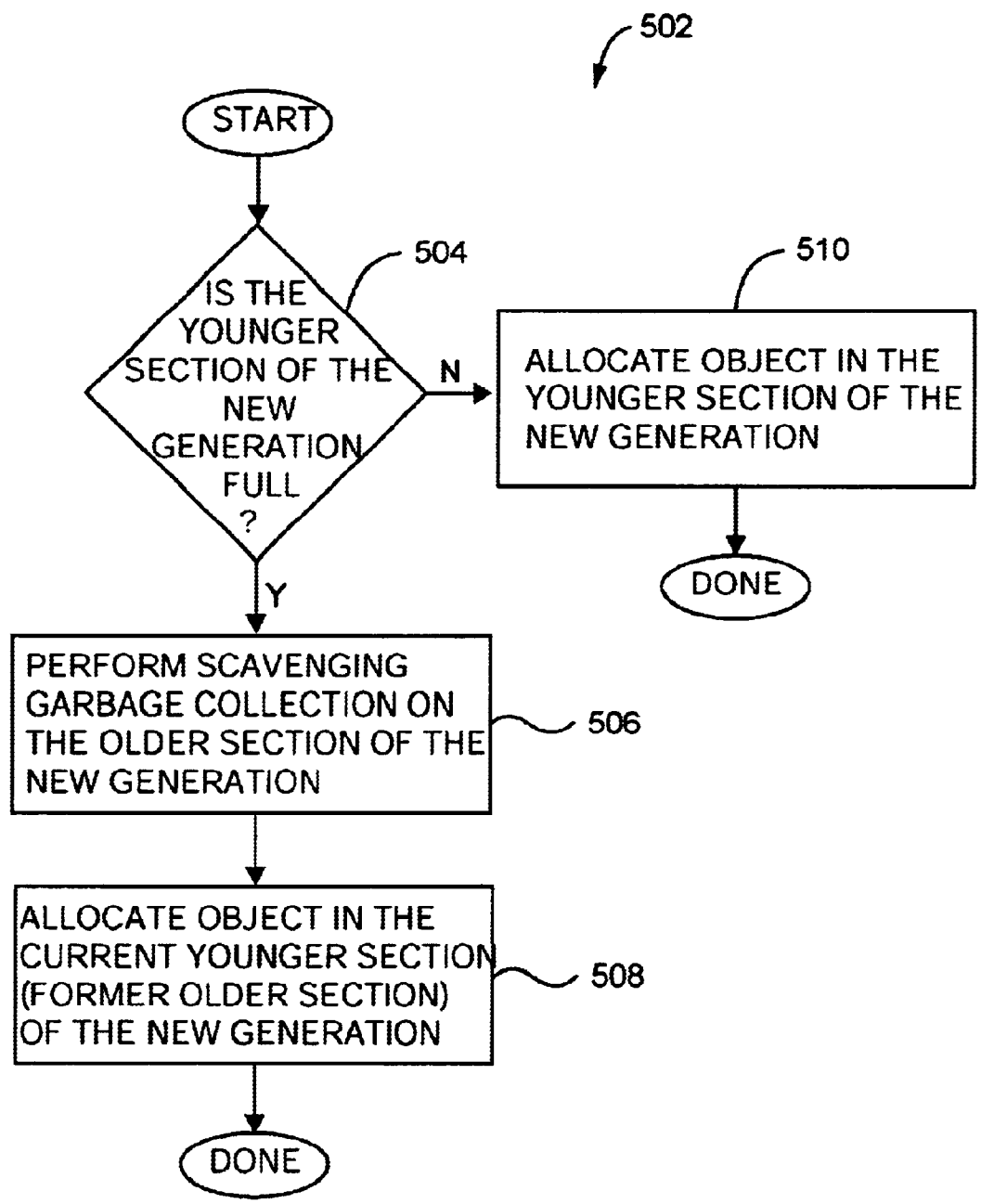
FIG. 5 is a process flow diagram which illustrates a process of allocating an object in memory space in accordance with an embodiment of the present invention.

With reference to FIG. 5, the steps associated with performing an object allocation that uses garbage collection process 402 of FIG. 4 when it is necessary to free memory space will be described in accordance with an embodiment of the present invention. As previously mentioned, a garbage collection often occurs to free additional memory space when there is not enough memory space available to permit an object to be allocated.

A process 502 of responding to an attempt to allocate an object in the new generation of a memory space begins at step 504 in which a determination is made as to whether the younger section, e.g., the younger nursery area, of the new generation is full. That is, it is determined whether the younger section of the new generation has sufficient free space to enable an object to be allocated in the younger section. If the determination is that the younger section is not full, the indication is that there is sufficient space in the younger section to support the allocation of an object. Accordingly, process flow moves from step 504 to step 510 where an object is allocated in the younger section. Once the object is allocated in the younger section, the process of responding to an attempt to allocate an object is completed.

Alternatively, when it is determined in step 504 that there is not sufficient space available in the younger section to enable an object to be allocated, then a scavenging garbage collection is performed on the older section of the new generation in step 506. One scavenging garbage collection process that may be used was previously discussed with respect to FIG. 4.

Performing the scavenging garbage collection in step 506 effectively causes the older section to be emptied, i.e., memory space in the older section is freed. As described above with respect to FIG. 4, once the older section is emptied, the older section and the younger section are effectively exchanged. That is, the older section, which is effectively empty, is treated as a current younger section while the younger section, which is full, is treated as a current older section. Although substantially any method may be used to treat the former older section as a current younger section, methods generally include setting various variables and flags to indicate that any new object allocation is to occur in this current younger section.

After the scavenging garbage collection is completed, an object is allocated in the current younger section in step 508. In other words, an object is allocated in the memory area which was emptied during the scavenging garbage collection. Once the object is allocated in step 508, the process of responding to an attempt to allocate an object is completed.

Figure 6:
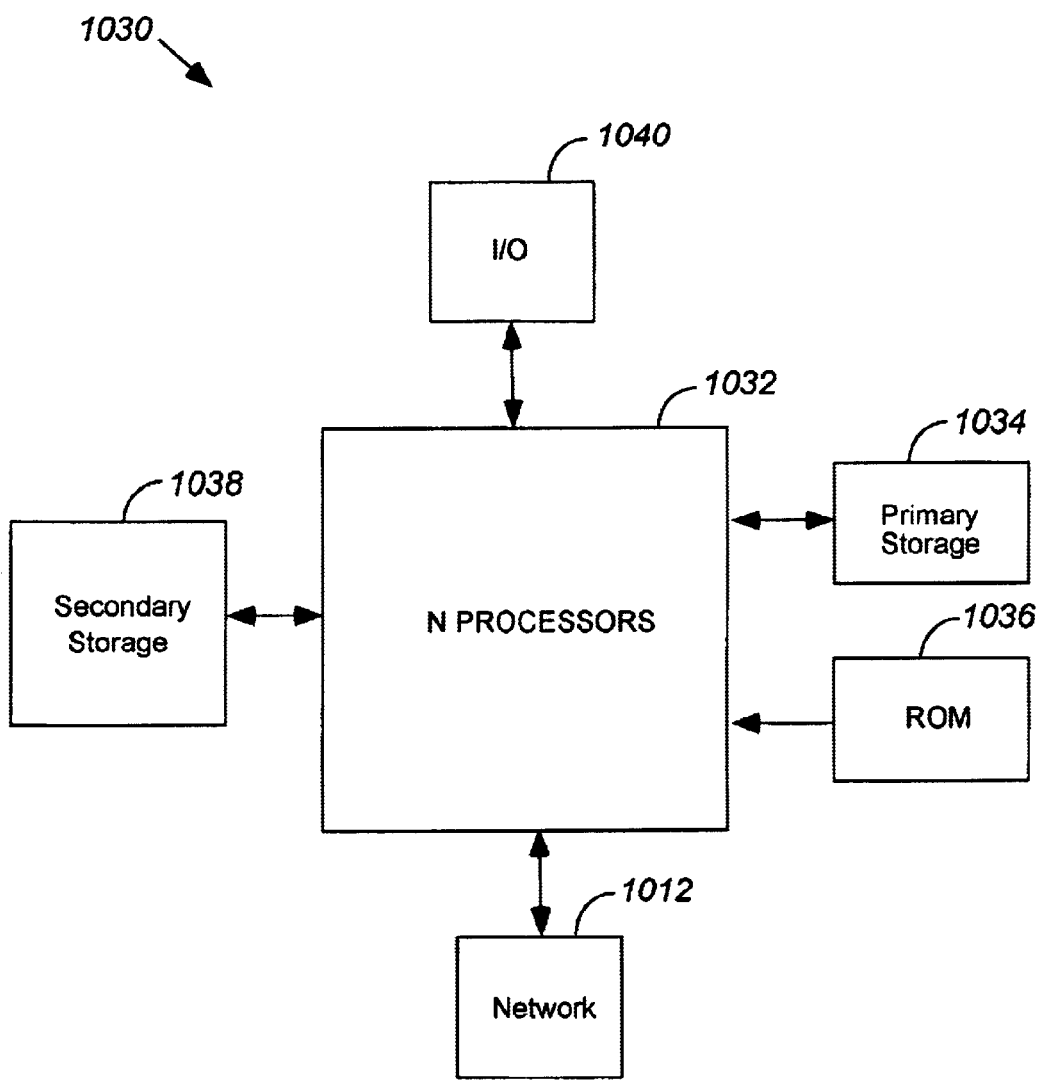
FIG. 6 is a diagrammatic representation of a general purpose computer system suitable for implementing the present invention.

FIG. 6 illustrates a typical, general purpose computer system suitable for implementing the present invention. The computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM).

Computer system 1030 or, more specifically, CPU 1032, may be arranged to support a virtual machine, as will be appreciated by those skilled in the art. One example of a virtual machine that is supported on computer system 1030 will be described below with reference to FIG. 7. As is well known in the art, ROM acts to transfer data and instructions uni-directionally to the CPU 1032, while RAM is used typically to transfer data and instructions in a bi-directional manner. CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1012. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Figure 7:
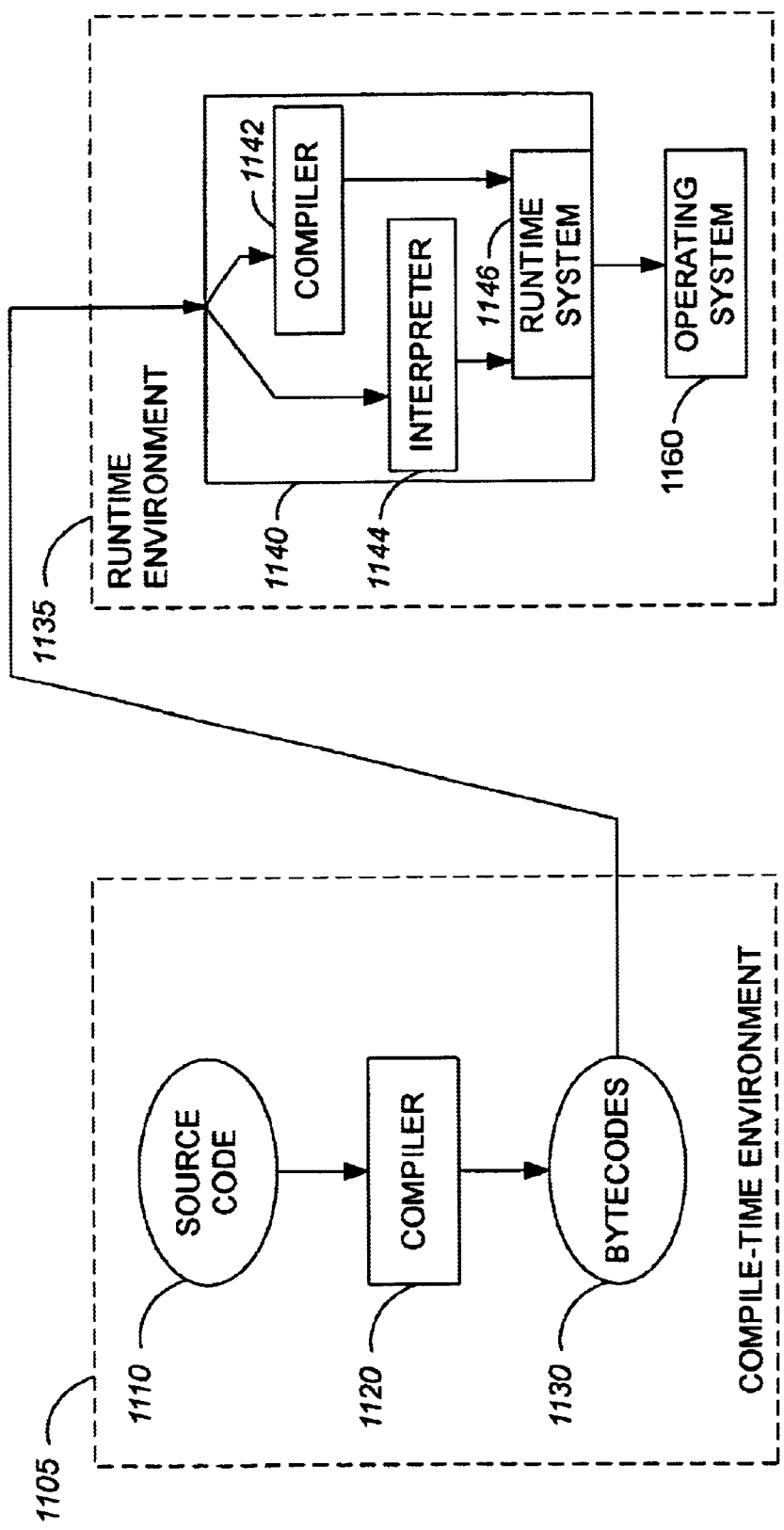
FIG. 7 is a diagrammatic representation of a virtual machine that is supported by the computer system of FIG. 6, and is suitable for implementing the present invention.

As previously mentioned, a virtual machine may execute on computer system 1030. FIG. 7 is a diagrammatic representation of a virtual machine which is supported by computer system 1030 of FIG. 6, and is suitable for implementing the present invention. When a computer program, e.g., a computer program written in the Java™ programming language developed by Sun Microsystems of Palo Alto, Calif., is executed, source code 1110 is provided to a compiler 1120 within a compile-time environment 1105. Compiler 1120 translates source code 1110 into byte codes 1130. In general, source code 1110 is translated into byte codes 1130 at the time source code 1110 is created by a software developer.

Byte codes 1130 may generally be reproduced, downloaded, or otherwise distributed through a network, e.g., network 1012 of FIG. 6, or stored on a storage device such as primary storage 1034 of FIG. 6. In the described embodiment, byte codes 1130 are platform independent. That is, byte codes 1130 may be executed on substantially any computer system that is running a suitable virtual machine 1140. By way of example, in a Java™ environment, byte codes 1130 may be executed on a computer system that is running a Java™ virtual machine.

Byte codes 1130 are provided to a runtime environment 1135 which includes virtual machine 1140. Runtime environment 1135 may generally be executed using a processor such as CPU 1032 of FIG. 6. Virtual machine 1140 includes a compiler 1142, an interpreter 1144, and a runtime system 1146. Byte codes 1130 may generally be provided either to compiler 1142 or interpreter 1144.

When byte codes 1130 are provided to compiler 1142, methods contained in byte codes 1130 are compiled into machine instructions, as described above. On the other hand, when byte codes 1130 are provided to interpreter 1144, byte codes 1130 are read into interpreter 1144 one byte code at a time. Interpreter 1144 then performs the operation defined by each byte code as each byte code is read into interpreter 1144. In general, interpreter 1144 processes byte codes 1130 and performs operations associated with byte codes 1130 substantially continuously.

When a method is called from an operating system 1160, if it is determined that the method is to be invoked as an interpreted method, runtime system 1146 may obtain the method from interpreter 1144. If, on the other hand, it is determined that the method is to be invoked as a compiled method, runtime system 1146 activates compiler 1142. Compiler 1142 then generates machine instructions from byte codes 1130, and executes the machine-language instructions. In general, the machine-language instructions are discarded when virtual machine 1140 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference in its entirety.

Although only a few embodiments of the present invention have been described, it should be understood that the present invention may be embodied in many other specific forms without departing from the spirit or the scope of the invention. By way of example, steps associated with performing a generational scavenging garbage collection on the older section of a new generation may be altered, added, and removed. For instance, a generational scavenging garbage collection may include a step of setting memory bits associated with the current younger section, i.e., the previous older section, to zero.

While the boundary that separates the younger section of a new generation from the older section of the new generation has been described as being flexible, it should be appreciated that in some embodiments, the boundary may be stationary. In other words, the boundary may be fixed such that the relative sizes of the younger section and the older section are constant. For example, the boundary may be fixed such that the younger section and the older section are of substantially the same size. When the boundary is fixed, there may effectively be two separate new generations which alternate being a younger new generation and an older new generation.

In general, a new generation may be divided into multiple sections such that new objects are allocated in one section while at least some of the other sections are scavenged when the one section fills up. It should be appreciated that a multi-section new generation enables a balance to be achieved between the length of time between scavenges and the length of a scavenge, by allowing the number of sections scavenged to be adjusted. In such an embodiment, the boundaries between a younger section and various older sections of a new generation may be flexible such that they may be moved to adjust the relative sizes of the sections. By way of example, if a younger section is larger than a particular older section prior to a garbage collection being performed and, hence, the "swapping" of the younger section and the older section, once a garbage collection is performed, the new older section may not have enough space to contain all the objects which were in the previous younger section. That is, the new older section may be full or even overflowed into the new younger section. If this is the case, some objects in the new older section may be relegated to the new younger section.

Alternatively, when the boundary is flexible and the sizes of the sections are not substantially equal, the boundary may be moved such that the new older section is always of the same size as a previous younger section. Specifically, in order to avoid issues associated with an overflowing new older section once garbage collection has occurred, the boundary may be moved such that the new older section is the same size as the previous younger section.

As previously mentioned, the sizing of the sections of a new generation may be a dynamic process. For example, if it is observed that garbage collection occurs more often than desired, the size of the younger section may be increased to give the objects in the older section more of a change to die before a garbage collection is initiated. Also, the size of a younger section may be increased when it is determined that during garbage collection on the older section, a significant number of live objects are copied into the old generation. On the other hand, the size of a younger section may be decreased when garbage collection occurs infrequently on the older section, and does not involve copying a significant number of live objects.

The use of a split new generation, i.e., a new generation that is effectively divided into a younger section and an older section, has been described as being suitable for a managed memory area that is divided into a new generation and an old generation. It should be appreciated, however, that a split new generation may be implemented in other managed memory areas as well. For instance, a split new generation may be implemented for use in a managed memory area which includes a from-space or to-space in addition to a new generation and an old generation without departing from the spirit or the scope of the present invention. Therefore, the present examples are to be considered as illustrative and not restrictive, and the invention is not to be limited to the details given herein, but may be modified within the scope of the appended claims.

What is claimed is:

1. A computer-implemented method for reclaiming memory space in a managed memory area, the managed memory area including a first area and a second area, the first area being arranged to store recently allocated objects, the second area being arranged to store older objects, the computer-implemented method comprising:

determining when a first section of the first area is substantially filled, wherein the first section is arranged to support new object allocation;

performing a garbage collection on a second section of the first area when it is determined that the first section is substantially filled;

setting the second section such that the second section is arranged to support new object allocation; and setting the first section such that the first section is no longer arranged to support new object allocation.

2. A computer-implemented method as recited in claim 1 wherein performing the garbage collection on the second section of the first area includes copying a live object from the second section of the first area into the second area.

3. A computer-implemented method as recited in claim 1 wherein the first section and the second section are separated by a boundary, and the computer-implemented method further includes adjusting the boundary to alter the relative sizes of the first section and the second section.

4. A computer-implemented method as recited in claim 1 further including:

attempting to allocate a new object in the second section after the second section is set to support new object allocation;

determining when the second section is substantially filled;

allocating the new object in the second section when it is determined that the second section is not substantially filled; and performing a garbage collection on the first section when it is determined that the second section is substantially filled.

5. A computer-implemented method as recited in claim 4 wherein when it is determined that the second section is substantially filled, the computer-implemented method further includes:

setting the second section such that the second section is not arranged to support new object allocation;

setting the first section such that the first section is arranged to support new object allocation; and allocating the new object in the first section.

6. A computer-implemented method as recited in claim 1 wherein determining when the first section is substantially filled includes determining when the first section includes sufficient memory space for an allocation of a new object.

7. A computer program product for reclaiming memory space in a managed memory area of a computer system, the managed memory area including a first area and a second area, the computer program product comprising:

computer code for determining when a first section of the first area is substantially filled, wherein the first section is arranged to support new object allocation;

computer code for performing a garbage collection on a second section of the first area when it is determined that the first section is substantially filled;

computer code for setting the second section such that the second section is arranged to support new object allocation;

computer code for setting the first section such that the first section is not arranged to support new object allocation; and a computer-readable medium that stores the computer codes.

8. A computer program product as recited in claim 7 wherein the computer code for performing the garbage collection on the second section includes computer code for copying a live object from the second section into the second area.

9. A computer program product as recited in claim 7 wherein the first section and the second section are separated by a boundary, and the computer program product further includes computer code for adjusting the boundary to alter the relative sizes of the first section and the second section.

10. A computer program product as recited in claim 7 further including:

computer code for attempting to allocate a new object in the second section after the second section is set to support new object allocation;

computer code for determining when the second section is substantially filled;

computer code for allocating the new object in the second section when it is determined that the second section is not substantially filled; and computer code for performing a garbage collection on the first section when it is determined that the second section is substantially filled.

11. A computer program product as recited in claim 10 further including:

computer code for setting the second section such that the second section is not arranged to support new object allocation when it is determined that the second section is substantially filled;

computer code for setting the first section such that the first section is arranged to support new object allocation when it is determined that the second section is substantially filled; and computer code allocating the new object in the first section when it is determined that the second section is substantially filled.

12. A computer program product as recited in claim 7 wherein the computer-readable medium is one selected from the group consisting of a CD-ROM, a floppy disk, an optical disk, a tape, a hard drive, and a data signal embodied in a carrier wave.

13. A computer system for reclaiming memory space in a managed memory area, the managed memory area including a first area and a second area, the first area being arranged to store recently allocated objects, the second area being arranged to store older objects, the computer system comprising:

a processor;

a determinator for determining when a first section of the first area is substantially filled, wherein the first section is arranged to support new object allocation;

a garbage collector arranged to scavenge a second section of the first area when it is determined that the first section is substantially filled; and a tracking mechanism arranged to set the second section such that the second section is arranged to support new object allocation, the tracking mechanism further being arranged to set the first section such that the first section is not arranged to support new object allocation.

14. A computer system as recited in claim 13 wherein the garbage collector is further arranged to copy a live object from the second section into the second area.

15. A computer system as recited in claim 14 wherein the first section and the second section are separated by a boundary, and the computer system further includes an adjuster for altering the relative sizes of the first section and the second section by moving the boundary.

16. A computer system as recited in claim 14 further including:

an object allocator for attempting to allocate a new object in the second section after the second section is set to support new object allocation; and a determinator for determining when the second section is substantially filled, wherein the object allocator allocates the new object in the second section when it is determined that the second section is not substantially filled, and wherein the garbage collector scavenges the first section when it is determined that the second section is substantially filled.

17. A computer system as recited in claim 16 wherein the tracking mechanism is further arranged to set the second section such that the second section is not arranged to support new object allocation and to set the first section such that the first section is arranged to support new object allocation, and the object allocator allocates the new object in the first section.

18. A memory structure in a computer system, the memory structure being arranged to store objects, the memory structure comprising:

a first area, the first area being partitioned into a first section and a second section, the first section being arranged to store a recently allocated object, the second section being arranged to store a first object allocated before the recently allocated object, wherein the second section is arranged to undergo a garbage collection when the first section is substantially full; and a second area, the second area being arranged to store a second object allocated before the first object.

19. A memory structure according to claim 18 wherein when the second section undergoes the garbage collection, the second section is set to store a third object, the third object being allocated more recently than the recently allocated object.

20. A method of reclaiming memory space in a managed memory area of computer system, the managed memory area including a first area being initially designated to store recently allocated objects, wherein the first area includes first and second sub-sections, the method comprising:

designating the first sub-section of the first area for allocation of new objects;

determining whether the first sub-section of the first area should no longer be designated for allocation of new objects;

performing garbage collection on the second sub-section of the first area when the determining determines that the first sub-section of the first area should no longer be designated for allocation of new objects; and designating the second sub-section instead of the first subsection for allocation of new objects when said garbage collection has been performed.

21. A method as recited in claim 20, wherein the managed memory area further includes a second area which is designated to store relatively older objects.

22. A method as recited in claim 20, wherein the determining of whether the first sub-section of the first area should no longer be designated for allocation of new objects comprises determining whether a new object cannot be allocated in the first sub-section of the first area.

* * * * *